H. Wells,
Hanging Saws.
Nº 12,705. Patented Apr. 10, 1855.

UNITED STATES PATENT OFFICE.

HIRAM WELLS, OF FLORENCE, MASSACHUSETTS.

DEVICE ALLOWING CIRCULAR-SAW SPINDLES TO YIELD.

Specification of Letters Patent No. 12,705, dated April 10, 1855.

*To all whom it may concern:*

Be it known that I, HIRAM WELLS, of Florence, in the county of Hampshire and State of Massachusetts, have invented an Improved Mechanism for Adjusting and Regulating the Longitudinal Movement of the Spindle of a Circular Saw; and I do hereby declare that the same is fully described and represented in the following specification and the accompanying drawings, letters, figures, and references thereof.

Figure 1:
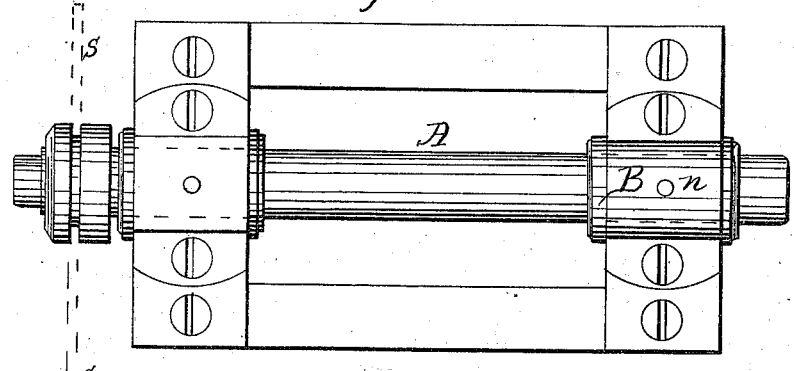
Figure 2:
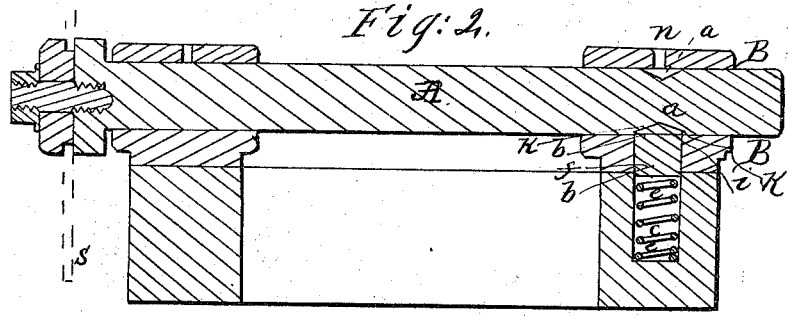
Figure 3:
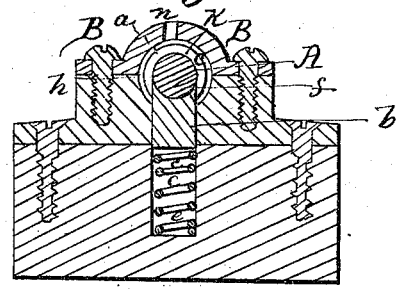
Figure 4:
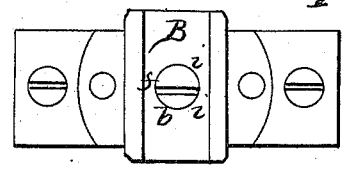

Of the said drawings, Figure 1, represents a top view of a spindle of a circular saw supported in its boxes and having my improvement applied to it. Fig. 2 is a longitudinal and vertical section of the same. Fig. 3 is a transverse section taken through the rearmost box and the guide to be hereinafter described. Fig. 4, is a top view of the guide and the lower half of the rear box.

In sawing timber with a circular saw, it becomes necessary to have some contrivance applied to the spindle of the saw in order to allow a sufficient degree of longitudinal play to each spindle to allow the saw to accommodate itself to the lateral movement or springing of a log while it is being sawed. For this purpose as in Orlando Childs' patent of December 17th 1850, of which I am the proprietor, springs have been used and applied to the journal boxes. With my improvement no such application of springs becomes necessary; nor do I use any collars on the saw spindle; nor friction rollers to embrace the saw near its periphery as is described in the patent of George Page—dated July 16th, 1841, the device I use being applied to the shaft or spindle and within one of the boxes thereof.

In carrying out my invention, I provide the saw spindle, A, where it rests in its boxes, B, B, with an angular groove, $a$, such groove being made to extend transversely entirely around it. The two sides of this groove may be said to be formed by two conical frusta, having their lesser bases placed in contact. In connection with this groove there is employed what may be termed the spring guide $b$, it being arranged so as to slide freely within a cylindrical chamber, $c$, leading downward from the lower half of the box as seen in the drawings. The lower part of the guide is made cylindrical so that it can turn freely and horizontally within said chamber, while it rests on a spring, $e$, placed therein as seen in Figs. 2, and 3. The upper part of said guide or that shown at, $f$, is formed as seen in the drawings and with two beveled faces $h$, $i$, which are borne upward respectively toward the two sides of the groove, $a$, by the action of the spring before mentioned. The spindle is to be so made and applied to its boxes as to be capable of being moved longitudinally therein. When the saw is affixed to it the saw may be supposed to be arranged on it as denoted by dotted lines at, S, in Figs. 1 and 2. In this improved device as herein above described, not only is the saw spindle permitted to have all the endwise play that may be necessary, or which may be produced by lateral pressure against the saw while it is in the act of sawing a log, but such saw after being so moved is restored to its correct position by the action of one or the other of the inclined edges of the guide against one of the frusto conical sides of the groove of the saw spindle, such action being produced by the upward pressure of the spring on which the guide rests. The said lateral movements of the saw are also limited within certain bounds, by means of shoulders, $k$, $k$, (formed in the groove of the shaft as seen in Figs. 2, and 3,) either of which by abutting against one of the sides of the upper part of the guide will arrest further longitudinal movement of the shaft.

When the guide is arranged within the box, as described and we pour oil into the hole, $n$, of the cup of the box, such oil will lubricate both the journal of the shaft and the guide and its groove, the latter operating to retain the oil within the box. Important advantages in lubricating the parts are thus gained by the arrangement of the guide and its groove within the box, as described.

What I claim is—

Arranging within the box or bearing and combining with it and the saw spindle substantially as specified, the guide, its spring, and the compound frusto conical grooves provided with shoulders as described, the whole constituting a device of great simplicity of construction and of much advantage in not only allowing a circular saw, while in operation to move laterally, but to limit such movement of it and subsequently restore it to its normal or original position.

In testimony whereof I have hereunto set my signature this twenty fourth day of January A. D. 1855.

HIRAM WELLS.

Witnesses:
HARNEY KIRKLAND,
SAMUEL L. HILL.